D. A. GILLEN.
NON-SIPHONABLE TRAP.
APPLICATION FILED JAN. 25, 1921.
1,398,427.
Patented Nov. 29, 1921.
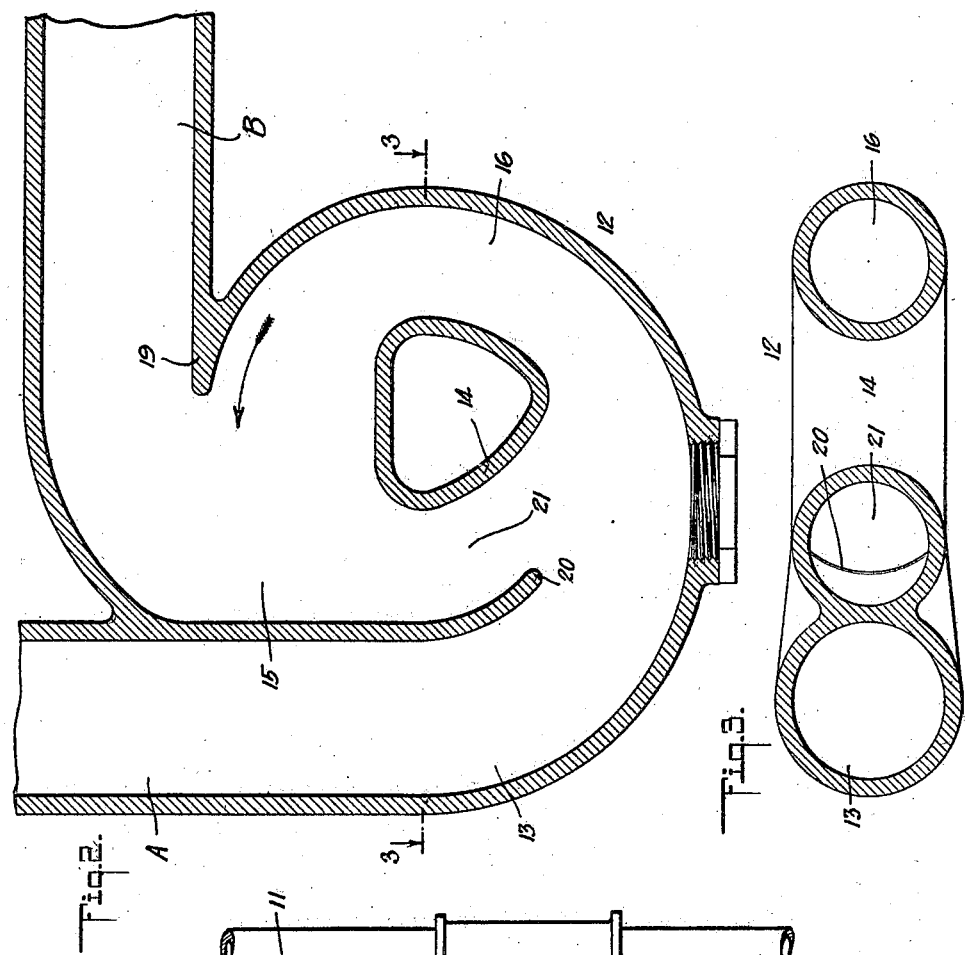
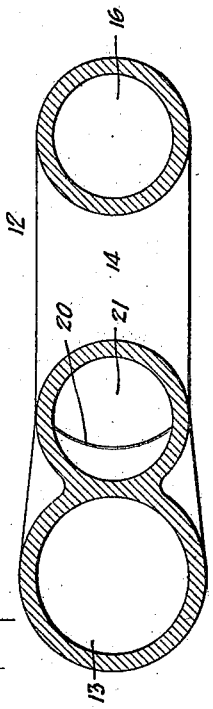
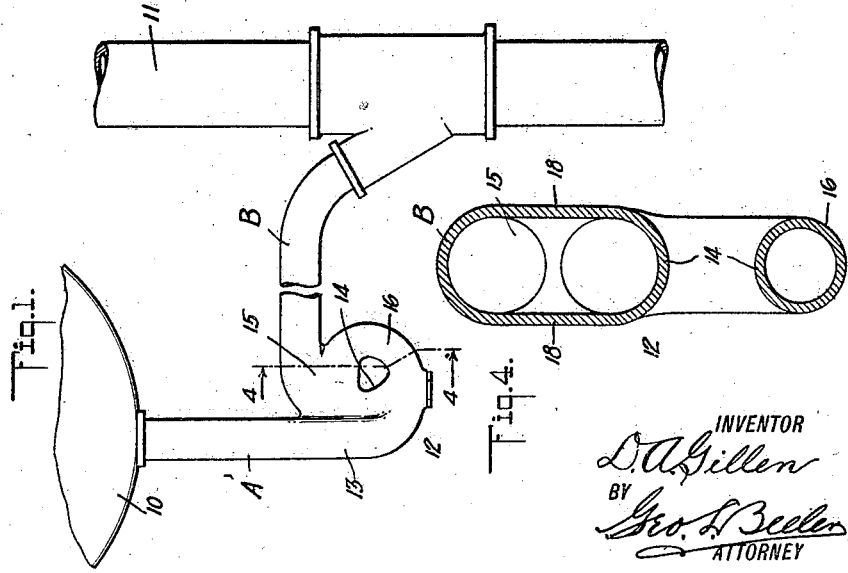

UNITED STATES PATENT OFFICE.

DANIEL A. GILLEN, OF FLUSHING, NEW YORK.

NON-SIPHONABLE TRAP.

1,398,427. Specification of Letters Patent. Patented Nov. 29, 1921.

Application filed January 25, 1921. Serial No. 439,756.

*To all whom it may concern:*

Be it known that I, DANIEL A. GILLEN, a citizen of the United States, residing at Flushing, in the county of Queens and State of New York, have invented certain new and useful Improvements in Non-Siphonable Traps, of which the following is a specification.

This invention relates to plumbing devices and has particular reference to traps, such as are commonly used under basins, sinks, stationary wash tubs, or the like.

Among the objects of the invention is to provide a trap to be located between a receptacle, such as a basin or the like, and the soil pipe, and which trap is so constructed as to prevent the drainage of the sealing water therefrom as a result of any amount of suction that may result from the down flow through the soil pipe.

Another object of the invention, therefore, is to provide a trap of the nature set forth that cannot be siphoned empty even though no vent pipe is provided auxiliary to the waste pipe, thereby providing a means to meet the requirements of plumbing regulations in the various municipalities and without the expense of the costly and sometimes unsightly air vents.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation, somewhat diagrammatic, of my improved trap located between a receptacle and a soil pipe serving as an outlet from any desired number of floors of a building.

Fig. 2 is a vertical sectional view of the trap indicating its interior form and action.

Fig. 3 is a horizontal section on the line 3—3 of Fig. 2.

Fig. 4 is a vertical section on the line 4—4 of Fig. 1.

Referring now more specifically to the drawings I show at 10 a receptacle, such as a basin or the like, a soil pipe 11, and my improved trap 12 located in a waste pipe between the receptacle and the soil pipe. The waste pipe comprises a section A leading from the receptacle and a section B leading from the trap into the soil pipe. Obviously any suitable joints or couplings for these several parts may be employed in accordance with established plumbing practice.

The trap is of an approximately circular form in side view, and may be described as comprising a tubular construction of spiral form, leading from the inlet 13 to the trap from the section A, around a transverse opening, or hollow member, the surrounding wall 14 of which constitutes a tubular deflector, to the body 15 at the top of the trap and from which delivery is made into section B. That portion 16 of the spiral passageway which sweeps around the deflector 14 is approximately only about one half the capacity or cross sectional area as the mouth B of the trap. For instance if the diameter of the pipe A and mouth 13 is an inch and a half in diameter, the section 16 may be one and one sixteenth or a little more. The section B is preferably of the same capacity as the section A, and the body 18 or upper portion of the trap is preferably somewhat greater in capacity than double the capacity of either A or B, considered vertically. See Fig. 4. In other words, the body is provided with flat parallel sides 18 spaced from each other a distance equal to the interior diameter of section B. The tube 16 ends in the body 15 and the water sweeping through it in a circular or spiral direction from the mouth 13 is forced around toward the mouth 13 by means of a deflector 19 extending from the bottom of section B rearward toward or into the body 15.

20 indicates a lip constituting the sealing point of the trap, or the point past which air is drawn first from the receptacle by suction as a result of the down flow through the soil pipe. In other words, in order for the trap to be maintained sealed it must hold a body of water the level of which is above the point 20, and in some jurisdictions it is demanded that the level of the water in the trap shall be maintained at least an inch and a half above said point. So far as the action of the water from the receptacle 10 is concerned the trap may be left filled with water as high as the deflector 19, but when a down flow or suction is caused from the soil pipe, the pull of such flow tends to empty all the water from the trap. It is to be observed, however, that because of the peculiar design of the trap illustrated it is a physical impossibility for enough of the water to be so sucked from the trap as to not leave ample water therein to cover the point 20. This effect is the result of the large and wide capacity of the body 15, the relative capacities of the devices A and 16, the position of the deflector 14, the position of the deflector 19, and the spiral path of the principal portion of the water passing through the trap.

At 21 I provide a by-pass between the deflector 14 and the lip 20. This by-pass in the normal use of the receptacle provides ample capacity for the flow of water through the trap, and for this reason the capacity of the by-pass is about the same as that of the tube 16. In the action of the flow down the soil pipe the by-pass gives direct upflow for the air sucked down past the lip 20, the sealing water depended upon for the trap occupying at such time a position in the pipe 16 and the main portion of the body 15. The water instead of being sucked out of the trap by the down flow in the soil pipe is given rather a swirling movement around the deflector 14, the deflector 19 serving among other things to cause the water thus being swirled to dash backward toward the mouth of the trap and so largely prevented from passing out through the pipe B.

I claim:

The herein described non-siphonable trap comprising a vertical inlet, a horizontal outlet, and a vertically arranged curved passageway communicating directly with the inlet and indirectly with the outlet and all in the same vertical plane, the width and capacity of the main curved passageway being less than that of the inlet or the outlet, a hollow transversely tubular deflector within the curved structure and around which the main flow takes place, the structure above said deflector constituting a body of a large capacity just within the outlet, a sealing lip at the lower end of the inlet, and a by-pass between the sealing lip and said deflector.

In testimony whereof I affix my signature.

DANIEL A. GILLEN.